(12) United States Patent
Imagawa et al.

(10) Patent No.: US 10,609,292 B2
(45) Date of Patent: Mar. 31, 2020

(54) IMAGING APPARATUS, AXLE LOAD MEASURING SYSTEM, AND IMAGING METHOD

(71) Applicant: Panasonic Intellectual Property Management Co., Ltd., Osaka (JP)

(72) Inventors: Taro Imagawa, Osaka (JP); Akihiro Noda, Nara (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 220 days.

(21) Appl. No.: 15/708,183

(22) Filed: Sep. 19, 2017

(65) Prior Publication Data

US 2018/0249058 A1    Aug. 30, 2018

(30) Foreign Application Priority Data

Feb. 28, 2017 (JP) ................................. 2017-036229
Sep. 6, 2017 (JP) ................................. 2017-170794

(51) Int. Cl.
*G06T 7/60* (2017.01)
*H04N 5/235* (2006.01)
*G06T 7/70* (2017.01)
*G01L 5/00* (2006.01)

(52) U.S. Cl.
CPC ............. *H04N 5/2351* (2013.01); *G06T 7/70* (2017.01); *G01L 5/00* (2013.01); *G06T 2207/10144* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 4,813,004 | A * | 3/1989 | Fujioka | G01G 19/022 340/666 |
| 10,093,140 | B2 * | 10/2018 | Dudar | G01J 5/04 |
| 2008/0191874 | A1 * | 8/2008 | Walker | G08B 13/2462 340/572.1 |
| 2009/0018721 | A1 * | 1/2009 | Mian | G01M 17/013 701/31.4 |
| 2010/0020194 | A1 | 1/2010 | Hirooka | |

(Continued)

FOREIGN PATENT DOCUMENTS

| | | |
|---|---|---|
| JP | 62-255828 | 11/1987 |
| JP | 2010-028596 | 2/2010 |
| JP | 2011-064462 | 3/2011 |

*Primary Examiner* — Christopher G Findley
(74) *Attorney, Agent, or Firm* — Wenderoth, Lind & Ponack, L.L.P.

(57) ABSTRACT

An imaging apparatus includes an imaging unit, a detector, a calculator, and a controller. The imaging unit captures an image of a road on which a vehicle runs, and generates the captured image of the road. The detector detects a contact position at which the vehicle is in contact with the road in the captured image. The calculator calculates a first brightness range based on brightness distribution in a first road surface area on the road and the first road surface area includes the contact position. The controller determines an imaging condition for the imaging unit based on the first brightness range, and controls the imaging unit using the determined imaging condition.

11 Claims, 8 Drawing Sheets

(56) References Cited

U.S. PATENT DOCUMENTS

2012/0020526 A1* 1/2012 Teti ..................... G06T 7/0004
  382/104
2015/0294174 A1* 10/2015 Karkowski ............ G06K 9/325
  382/182

* cited by examiner

IMAGING APPARATUS, AXLE LOAD MEASURING SYSTEM, AND IMAGING METHOD

BACKGROUND

1. Technical Field

The present disclosure relates to an imaging apparatus and an imaging method for capturing and generating an image for measuring displacement on a road surface. The present disclosure also relates to an axle load measuring system for measuring an axle load of a vehicle, using the captured image.

2. Description of the Related Art

For example, Unexamined Japanese Patent Publication No. 2011-64462 discloses an axle load meter correction method. With this axle load meter correction method, an axle load sensor for measuring an axle load is buried under a vehicle road to allow a vehicle having a known axle load to run on the road, and to capture an image of a license plate of the vehicle by a camera. The vehicle can be identified with the license plate shown on the captured image, and an axle load meter can be corrected by using a simultaneously acquired axle load value of the vehicle.

SUMMARY

The present disclosure provides an imaging apparatus capable of clearly capturing an image of a road on which a vehicle runs.

An imaging apparatus according to an aspect of the present disclosure includes an imaging unit, a detector, a calculator, and a controller. The imaging unit captures an image of a road on which a vehicle runs, and generates the captured image of the road. The detector detects a contact position at which the vehicle is in contact with the road in the captured image. The calculator calculates a first brightness range based on brightness distribution in a first road surface area on the road and the first road surface area includes the contact position. The controller determines an imaging condition for the imaging unit based on the first brightness range, and controls the imaging unit using the determined imaging condition.

An imaging method according to another aspect of the present disclosure includes steps of detecting, calculating, determining, and controlling. In the detecting step, a contact position at which a vehicle is in contact with a road is detected in a captured image of the road on which the vehicle runs. In the calculating step, a first brightness range is calculated based on brightness distribution in a first road surface area including the contact position on the road. In the determining step, an imaging condition for an imaging unit is determined based on the first brightness range. In the controlling step, the imaging unit is controlled by using the determined imaging condition.

With the imaging apparatus and the imaging method of the present disclosure, an image of a road on which a vehicle runs can clearly be captured.

DETAILED DESCRIPTION

An imaging apparatus according to an aspect of an exemplary embodiment includes an imaging unit, a detector, a calculator, and a controller. The imaging unit captures an image of a road on which a vehicle runs, and generates the captured image of the road. The detector detects a contact position at which the vehicle is in contact with the road in the captured image. The calculator calculates a first brightness range based on brightness distribution in a first road surface area on the road and the first road surface area includes the contact position. The controller determines an imaging condition for the imaging unit based on the first brightness range, and controls the imaging unit using the determined imaging condition.

The imaging apparatus can therefore capture a clear image of a road on which a vehicle runs. Precision of an axle load measuring device can thus be maintained, using an image.

It is to be noted that these generic or specific aspects may be implemented by using a system, a method, an integrated circuit, a computer program, or a computer-readable recording medium such as a compact disc read only memory (CD-ROM), and may also be implemented by any combination of the system, the method, the integrated circuit, the computer program, and the recording medium.

A specific example of the imaging apparatus according to the aspect of the present disclosure will now be described herein. It should be noted that each of the exemplary embodiments described hereafter illustrates a preferred specific example of the present disclosure. The numerical values, shapes, materials, components, disposition and connection of the components, steps, processing order of the steps, etc. shown in the following exemplary embodiments are mere examples, and are not intended to limit the present disclosure. The present disclosure is limited only by the scope of the claims. Accordingly, among the components in the following exemplary embodiments, components not recited in any of independent claims indicating the most generic concept of the present disclosure are not essential for achieving the object of the present disclosure but are described as preferable components.

First Exemplary Embodiment

An operation in an axle load measuring system provided, as an aspect of the present disclosure, in a road on which ordinary vehicles run will now be described herein.

An imaging apparatus, which is assumed to be incorporated and operated in an axle load measuring system, will now be described herein with reference to the drawings.

1-1. Configuration

Figure 1:
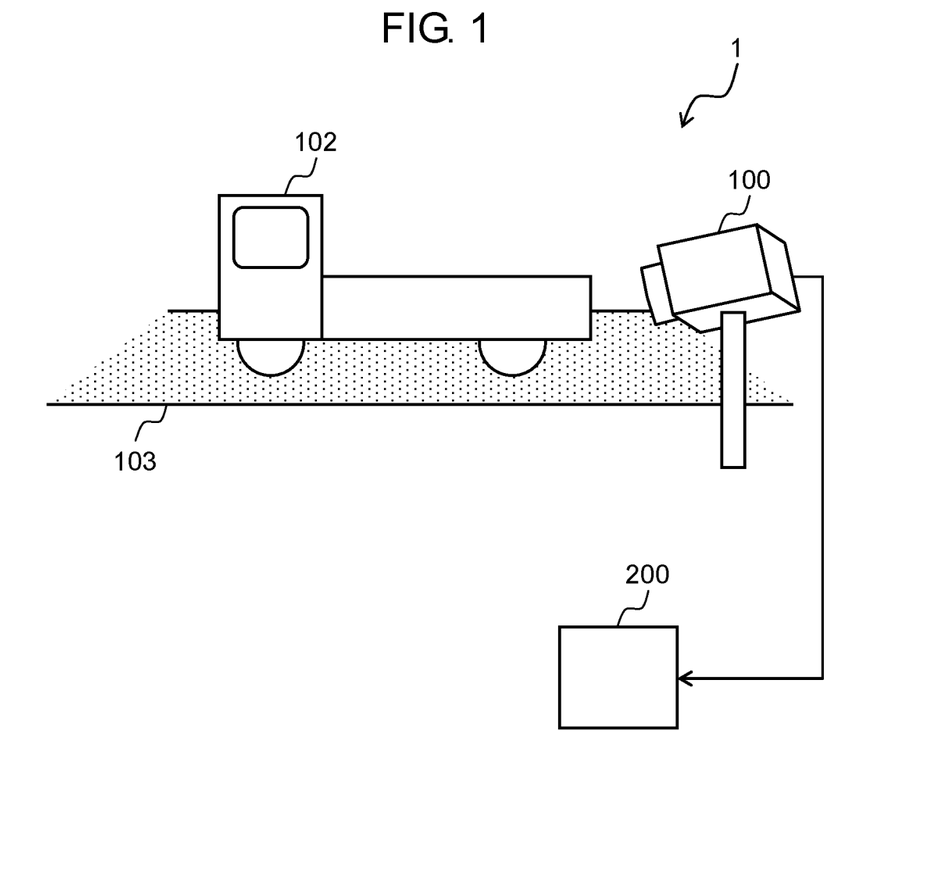
FIG. 1 is a view schematically illustrating one example of a state in which an axle load is measured, according to an exemplary embodiment.

FIG. 1 is a view schematically illustrating an example of a state in which axle load measuring system 1 according to the exemplary embodiment measures an axle load of vehicle 102. Axle load measuring system 1 includes imaging apparatus 100 and axle load measuring device 200.

For example, axle load measuring device 200 is in here connected to imaging apparatus 100. Imaging apparatus 100 captures an image of road 103 on which vehicle 102 runs, and generates the image in which road 103 is captured. A plurality of captured images generated by imaging apparatus 100 is inputted into axle load measuring device 200. Axle load measuring device 200 measures an axle load of vehicle 102, using the input, captured images. In here, for example, vehicle 102 is a truck, and road 103 is an asphalt road.

Figure 2:
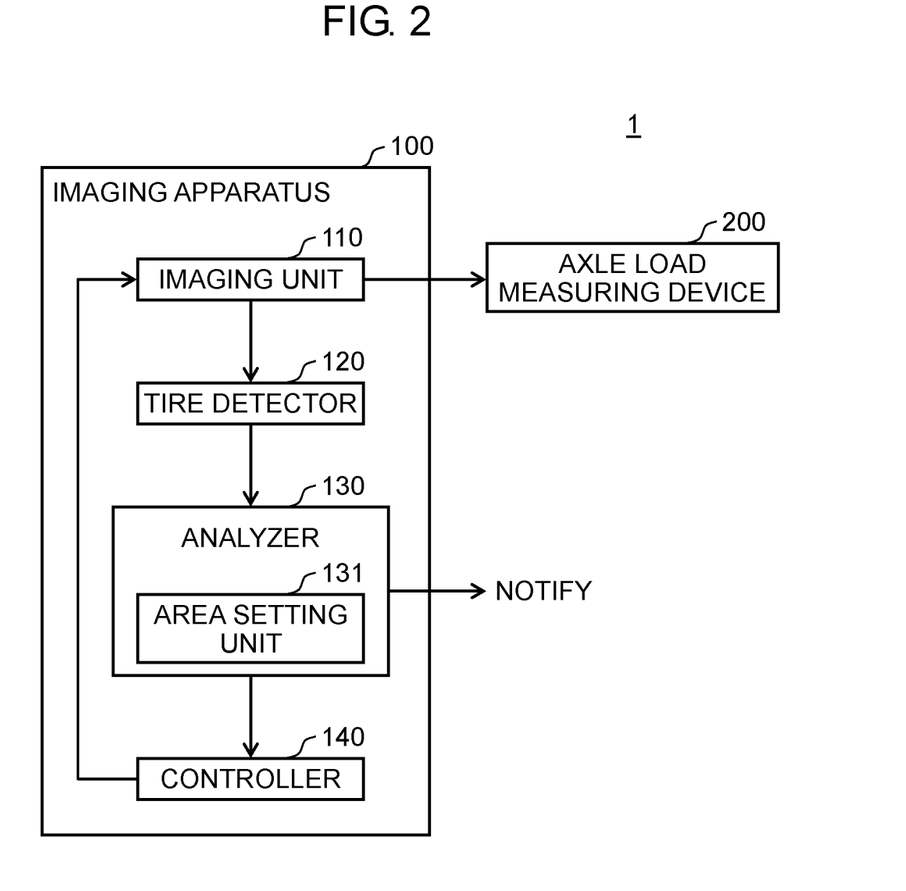
FIG. 2 is a block diagram illustrating a configuration of an imaging apparatus according to the exemplary embodiment.

FIG. 2 is a block diagram illustrating a configuration of imaging apparatus 100 according to a first exemplary embodiment of the present disclosure. Imaging apparatus 100 includes imaging unit 110, tire detector 120, analyzer 130, and controller 140. Analyzer 130 includes area setting unit 131. Tire detector 120 is an example of a detector. Analyzer 130 is an example of a calculator.

Imaging unit 110 captures an image of road 103 based on an externally controllable imaging condition (including at least one of items such as an exposure time, a diaphragm, a gain, and a black level), and generates the image in which road 103 is captured. Imaging unit 110 outputs the image in which road 103 is captured to tire detector 120 and axle load measuring device 200. The captured image is outputted to axle load measuring device 200 through wireless or wired communication or through a recording medium.

Tire detector 120 performs image recognition processing on the captured image generated by imaging unit 110. Tire detector 120 recognizes a tire of the traveling vehicle in the captured image, and detects a position (contact position) at which the tire is in contact with the road.

Area setting unit 131 sets, on the captured image, a first road surface area including the position at which the tire is in contact with the road, which is detected by tire detector 120. A first road surface area refers to an area that is influenced by an axle load of a vehicle.

Analyzer 130 generates brightness distribution in an image of the first road surface area set by area setting unit 131, and analyzes the brightness distribution. Analyzer 130 calculates a first brightness range based on the brightness distribution. A first brightness range will be described later.

Controller 140 determines an imaging condition for imaging unit 110 based on the first brightness range calculated by analyzer 130, and controls imaging unit 110 using the determined imaging condition. Controller 140 sets the determined imaging condition in imaging unit 110. Imaging unit 110 may retain a predetermined imaging condition. For example, when imaging apparatus 100 is in an initial state, controller 140 controls imaging unit 110 using the predetermined imaging condition. The predetermined imaging condition may also be used if analyzer 130 has failed to calculate a first brightness range.

Figure 3:
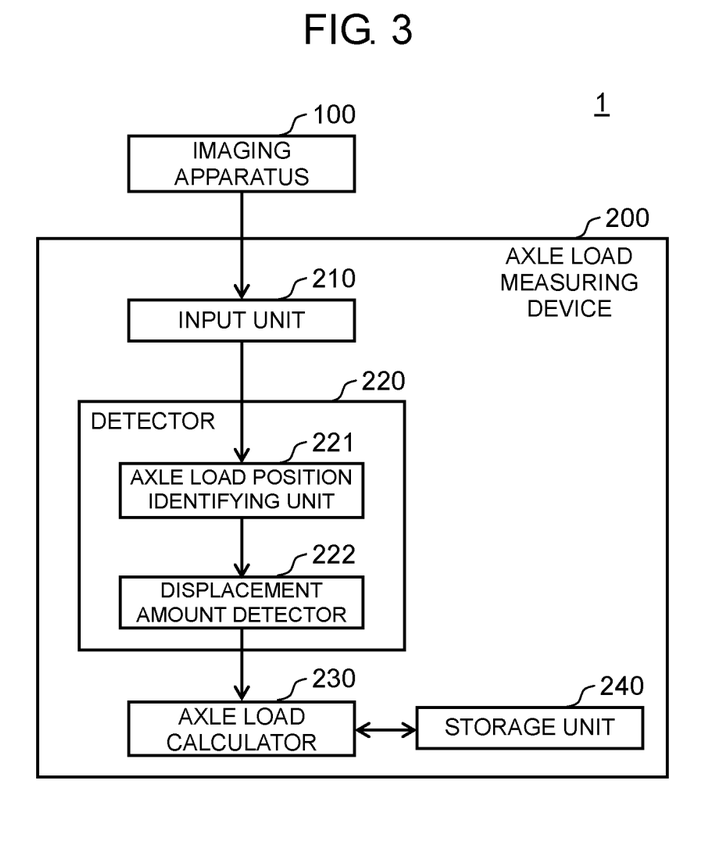
FIG. 3 is a block diagram illustrating a configuration of an axle load measuring device according to the exemplary embodiment.

FIG. 3 is a block diagram illustrating a configuration of axle load measuring device 200 according to the first exemplary embodiment of the present disclosure. As illustrated in FIG. 3, axle load measuring device 200 includes input unit 210, detector 220, axle load calculator 230, and storage unit 240. In addition, detector 220 includes axle load position identifying unit 221 and displacement amount detector 222.

Input unit 210 accepts entries of a plurality of captured images generated by imaging apparatus 100. Herein, input unit 210 accepts an entry of a digital image with 4096 pixels×2160 pixels, for example. The captured images are inputted through wireless or wired communication or through a recording medium.

Detector 220 detects, at a predetermined point, an amount of displacement corresponding to displacement generated on a surface of a road when a vehicle runs.

When a captured image accepted by input unit 210 includes a vehicle, axle load position identifying unit 221 identifies an axle load position of the vehicle in the captured image. More specifically, axle load position identifying unit 221 performs image recognition processing on the captured image to determine whether the captured image includes the vehicle. When axle load position identifying unit 221 determines that the vehicle is included, axle load position identifying unit 221 further performs image recognition processing, recognizes a tire of the vehicle, and identifies, as an axle load position, an area on the road, which corresponds to a lowermost point of the tire.

Displacement amount detector 222 detects, using the image in which the road on which the vehicle travels is captured, an amount of displacement, in the captured image, corresponding to displacement caused on the road when an axle load is applied. Particularly, when axle load position identifying unit 221 identifies the axle load position, displacement amount detector 222 detects an amount of displacement corresponding to displacement at the identified axle load position. In other words, displacement amount detector 222 compares a captured image in which no displacement is observed on a road and a captured image in which displacement is observed on the road, among a plurality of captured images accepted by input unit 210, to detect an amount of displacement. An amount of displacement between captured images can be detected by using block matching, a correlation method, or an optical flow. For example, this amount of displacement is calculated as a number of pixels, which indicates a difference in pixel position corresponding to a certain point on a road in captured images to be compared. A captured image in which no displacement is observed may be a captured image in which a road is captured in advance in a state that a target being subject to an axle load is not present, a captured image in which an amount of change in image is a certain level or lower among a plurality of images captured in succession, or a captured image determined, through image recognition processing, to not include a target being subject to an axle load.

Storage unit 240 stores first information indicating a relation between an axle load and an amount of displacement. More specifically, storage unit 240 stores, as the first information, a relational expression indicating a relation between an axle load and an amount of displacement on a road applied with the axle load, and a displacement coefficient that is a coefficient used for this relational expression. Storage unit 240 may be achieved by a memory (not illustrated) configuring axle load measuring device 200, or a database in a communicable external device.

In general, axle load w (kg) is represented by an expression of w=f(d) as function f with respect to an amount of displacement d (a number of pixels). Herein, function f is handled after being approximated by a primary expression. Storage unit 240 therefore stores, as a relational expression, a primary expression (w=αd), where d represents a variable, and α represents a coefficient, as well as stores coefficient α as a displacement coefficient.

Displacement coefficient a has, for each position that can be identified as an axle load position by axle load position identifying unit 221, a displacement coefficient value associated with the position. Differences including a difference in distance from a position at which an image is captured to the axle load position, a difference in composition of a material such as asphalt, a difference in temperature on a road surface, and a difference in how a road surface is degraded can therefore be reflected per area on a road. Displacement coefficient a in here has, per an area (hereinafter referred to as "local area") of 10 pixels in width (x direction) and 10 pixels in height (y direction) in a captured image, for example, a value corresponding to the local area.

Figure 4:
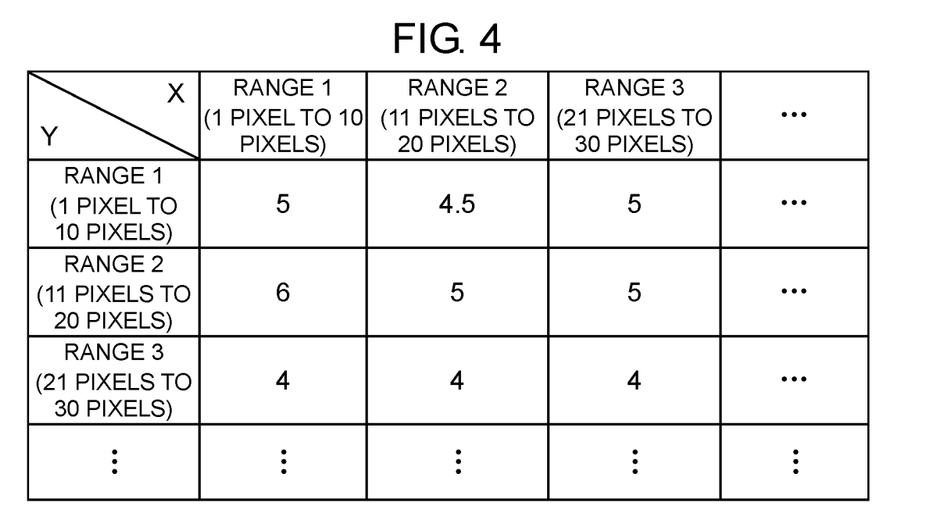
FIG. 4 is a configuration table of displacement coefficient data.

FIG. 4 is a table illustrating an example of displacement coefficient a stored in storage unit 240. Axle load calculator 230 calculates an axle load of a vehicle present on a road based on an amount of displacement detected by detector 220 and the first information stored in storage unit 240. Particularly, when axle load position identifying unit 221 identifies an axle load position, axle load calculator 230 calculates an axle load based on an amount of displacement at the identified axle load position. More specifically, axle load calculator 230 calculates axle load w by multiplying an amount of displacement d detected by displacement amount detector 222 by a displacement coefficient value corresponding to an area including the axle load position identified by axle load position identifying unit 221.

In axle load measuring system 1 configured as described above, measurement precision of axle load measuring device 200 depends on sharpness of an image captured by imaging apparatus 100. Imaging apparatus 100 of the present disclosure captures and generates an image appropriate for allowing axle load measuring device 200 to measure an axle load. In other words, imaging apparatus 100 in particular captures and generates a clear image, which shows an area around a tire, to be used by detector 220 of axle load measuring device 200.

An operation of imaging apparatus 100 of the present disclosure will now be described herein with reference to the drawings.

1-2. Operation 1-2-1. Imaging

Figure 5:
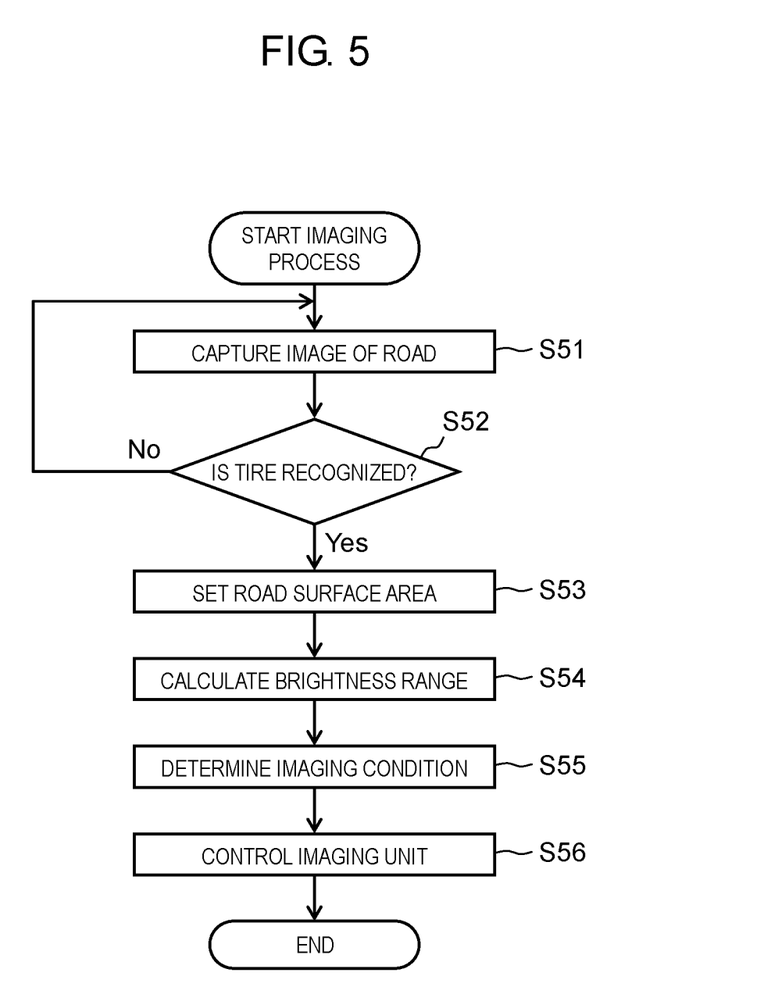
FIG. 5 is a flowchart for describing an operation of the imaging apparatus.
Figure 6:
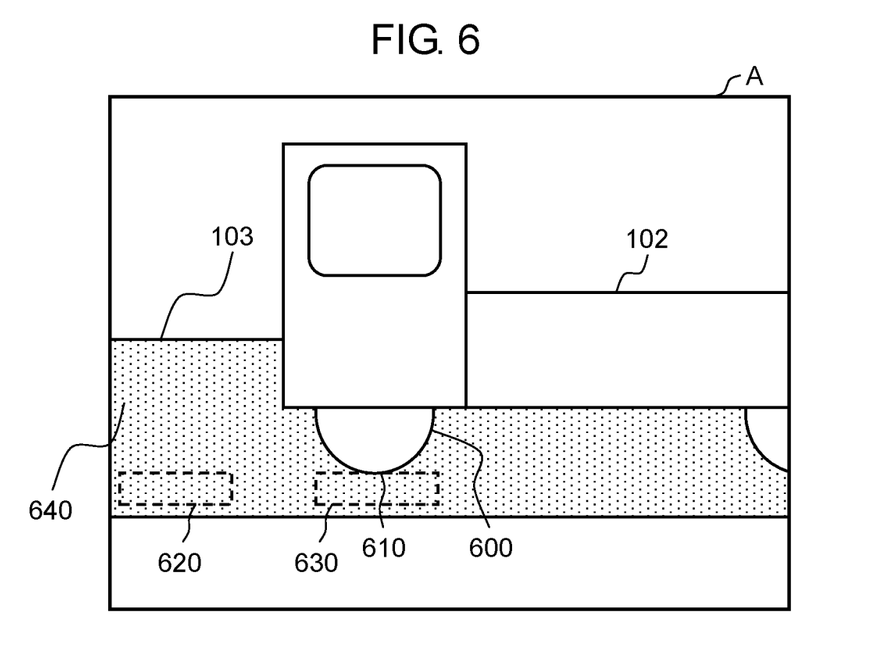
FIG. 6 is a view illustrating an example of a captured image.
Figure 7:
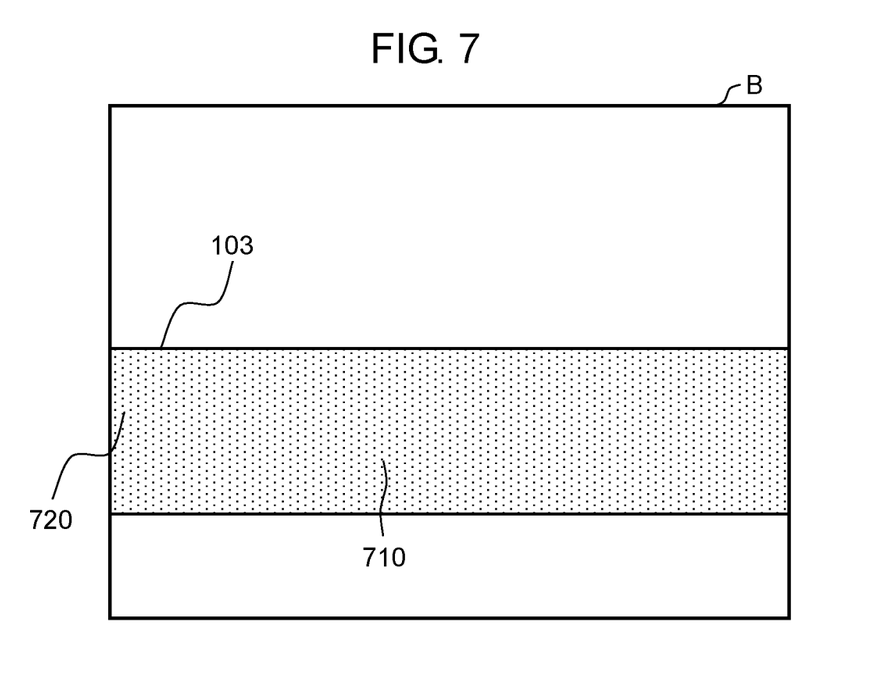
FIG. 7 is a view illustrating another example of a captured image.

FIG. 5 is a flowchart illustrating an operation of the imaging apparatus. FIG. 6 is a view illustrating an example of a captured image. FIG. 7 is a view illustrating another example of a captured image.

FIG. 6 illustrates the captured image in which a vehicle is included (hereinafter referred to as "captured image A"). Captured image A includes vehicle 102 traveling on road 103. Vehicle 102 is in contact with road 103 at lowermost point 610 of tire 600.

FIG. 7 illustrates the captured image in which no vehicle is included (hereinafter referred to as "captured image B"). Captured image A and captured image B are images in which road 103 is captured from an identical point of view. Area 710 on road 103 in captured image B is identical to an area on road 103 in captured image A, which corresponds to lowermost point 610 of the tire. Area 720 on road 103 in captured image B is identical to area 640 on road 103 in captured image A.

In response to a control of controller 140, imaging unit 110 first captures an image of road 103 based on a predetermined imaging condition (including at least one of items such as an exposure time, a diaphragm, a gain, and a black level) (step S51).

Tire detector 120 performs image recognition processing on the image captured and generated by imaging unit 110, and recognizes tire 600 of traveling vehicle 102 in the captured image (step S52).

If tire detector 120 does not recognize a tire, a process returns to step S51. When tire detector 120 has recognized a tire, the process proceeds to step S53. For example, when an image generated by imaging unit 110 corresponds to captured image A illustrated in FIG. 6, tire detector 120 recognizes tire 600, and acquires lowermost point 610 immediately below tire 600 as a contact position between tire 600 and road 103. When an image captured and generated by imaging unit 110 corresponds to captured image B illustrated in FIG. 7, no tire is detected, and the process returns to step S51.

Area setting unit 131 sets first road surface area 630 including lowermost point 610 on captured image A based on a position of tire 600 detected by tire detector 120 (step S53). First road surface area 630 is an area that is subject to an axle load of vehicle 102 via tire 600 (step S54). When a captured image corresponds to captured image A, area setting unit 131 sets, as first road surface area 630, based on lowermost point 610, a road surface lying in a direction toward which vehicle 102 moves forward, a road surface lying in a direction opposite to the direction toward which vehicle 102 moves forward, or a road surface on an outer, left side of vehicle 102. A size of first road surface area 630 may be set beforehand. A size of first road surface area 630 may be set based on a size of detected tire 600. A size of first road surface area 630 may be set based on a result of detection of displacement on a road surface, which will be described later.

Analyzer 130 generates brightness distribution from a captured image in first road surface area 630 set by area setting unit 131, and analyzes the brightness distribution. Specifically, analyzer 130 generates a brightness histogram with respect to first road surface area 630. Analyzer 130 determines an upper limit and a lower limit for brightness in first road surface area 630, and outputs a range between the upper limit and lower limit as a first brightness range.

Figure 8A:
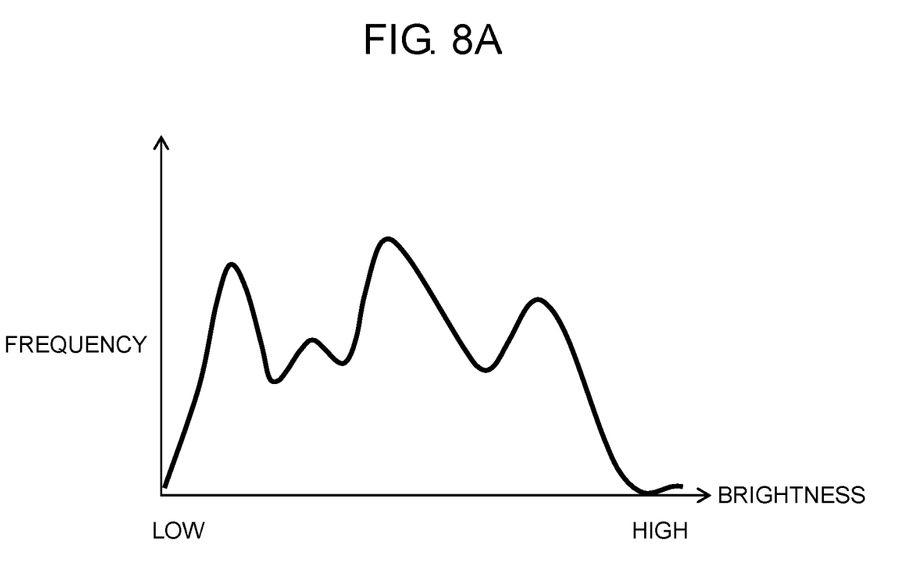
FIG. 8A is a graph illustrating an example of brightness distribution.
Figure 8B:
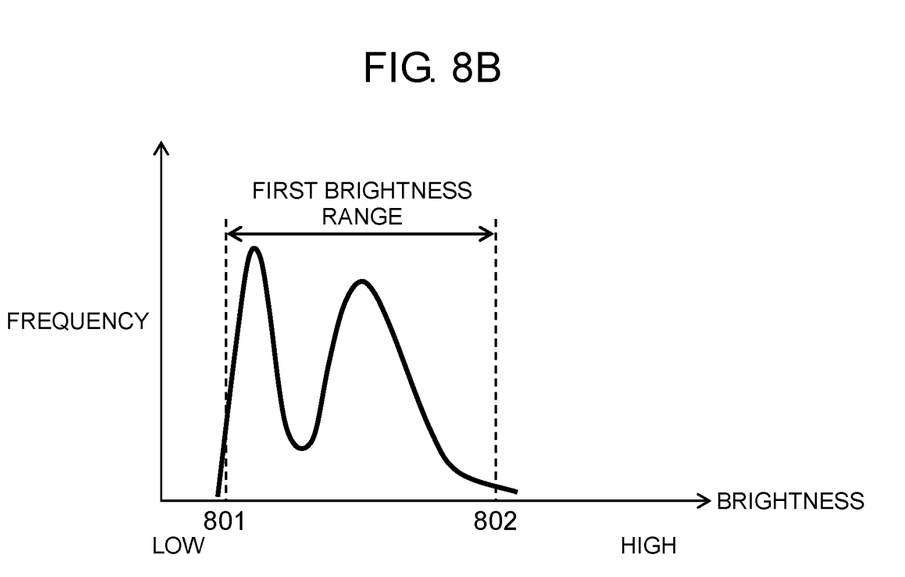
FIG. 8B is a graph illustrating another example of brightness distribution.

FIG. 8A is a graph illustrating an example of brightness distribution. FIG. 8B is a graph illustrating another example of brightness distribution. In FIGS. 8A and 8B, horizontal axes represent brightness, and vertical axes represent a frequency of brightness.

FIG. 8A illustrates an example of a brightness histogram with respect to whole captured image A illustrated in FIG. 6. The brightness histogram illustrated in FIG. 8A indicates that captured image A includes pixels in which brightness varies from low to high. On the other hand, FIG. 8B illustrates an example of a brightness histogram with respect to first road surface area 630. In other words, FIG. 8B illustrates brightness distribution in pixels in an image in which road 103 is captured. Pixels in an image in which an asphalt-paved road is captured generally tend to have lower brightness. A road around a tire might be further darker when sunlight or illumination light is shaded when a vehicle runs. A frequency of pixels having lower brightness is higher in the brightness histogram illustrated in FIG. 8B than in the brightness histogram illustrated in FIG. 8A.

Analyzer 130 determines upper limit 802 and lower limit 801 for brightness with which an image should be captured, based on the brightness distribution illustrated in FIG. 8B. An upper limit may not always be a top end of brightness distribution. A lower limit may also not always be a lower end of brightness distribution. An upper limit may be set to a value of upper 5% in brightness distribution, or may be set to a value obtained by adding a certain margin to a value of the top end. Similarly, a lower limit may be set to a value of lower 5% in brightness distribution, or may be set to a value obtained by adding a certain margin to a value of the lower end.

In the above described example, controller 140 has determined upper limit 802 and lower limit 801 based solely on first road surface area 630 including a road surface that is subject to an axle load. However, controller 140 may set a road surface area (second road surface area 620), other than first road surface area 630, and may determine an imaging condition for imaging unit 110 based on a brightness range in the road surface area (second brightness range) and a first brightness range (see FIG. 6). Second road surface area 620 is a road surface area used for comparison, where no axle load is applied, and is an area that is at least a predetermined distance away from first road surface area 630. When second road surface area 620 is used, controller 140 generates brightness distribution (a brightness histogram) in second road surface area 620, analyzes the brightness distribution, and calculates a second brightness range. Controller 140 may determine an upper limit and a lower limit for brightness with which an image should be captured, based on the first brightness range and the second brightness range. A further precise action for reducing an effect of vibrations of imaging apparatus 100 when measuring an axle load using an image, which will be described later, can therefore be expected.

Analyzer 130 may determine whether the calculated first brightness range satisfies the predetermined condition, and, if the first brightness range does not satisfy the predetermined condition, may store the analyzed, captured image. Analyzer 130 may otherwise, if the first brightness range does not satisfy the predetermined condition, notify that the analyzed, captured image is abnormal. A user of imaging apparatus 100 is therefore able to know an abnormality in a captured image. A case where a predetermined condition is not satisfied includes, for example, a case where most of values of pixels in a target image area concentrate around a certain value, and thus upper limit 802 and lower limit 801 are almost equal to each other (no brightness range can be calculated).

Controller 140 determines an imaging condition based on a brightness range calculated by analyzer 130. Controller 140 adjusts an imaging condition including at least one of items such as a diaphragm, a gain, an exposure time, and a black level of imaging unit 110 so that a calculated brightness range corresponds to a brightness range with which capturing an image is possible. Controller 140 can determine an imaging condition, similar or identical to a case where an image is normally captured by a camera. Controller 140 can in here set an upper limit for an exposure time for avoiding an unfocused image and for maintaining a frame rate. If incoming light is not enough in amount, controller 140 can prioritize lowering of a gain to maintain precision in detecting displacement using an image, which will be described later (step S55).

Once an inappropriate imaging condition has been set, a state that no tire is detected would continue. To avoid such inconvenience, controller 140 may control imaging unit 110 with a predetermined imaging condition if no tire is detected for a predetermined period.

Finally, controller 140 sets an imaging condition in imaging unit 110. In other words, controller 140 controls imaging unit 110 using the determined imaging condition (step S56). Controller 140 updates the imaging condition in a unit of a shortest frame rate. However, when a time taken by steps S51 to S56 extends longer, controller 140 may delay several frames for updating an imaging condition. In other words, a captured image should have included a target tire. Updating an imaging condition in a unit of a lesser number of frames through a sequential control might cause an inability to properly capture an image due to a delayed control. To avoid such inconvenience, controller 140 may control imaging unit 110 in accordance with running of a vehicle for which a tire is detected. In other words, controller 140 may control, after an imaging condition has been determined, imaging unit 110 using the determined imaging condition in a predetermined period (a period until when an image capturing condition with respect to a contacting position is changed next time). Imaging unit 110 can therefore well capture an image of a next vehicle from a first frame in which the vehicle enters an image capturing range.

1-2-2. Measurement Process

Figure 9:
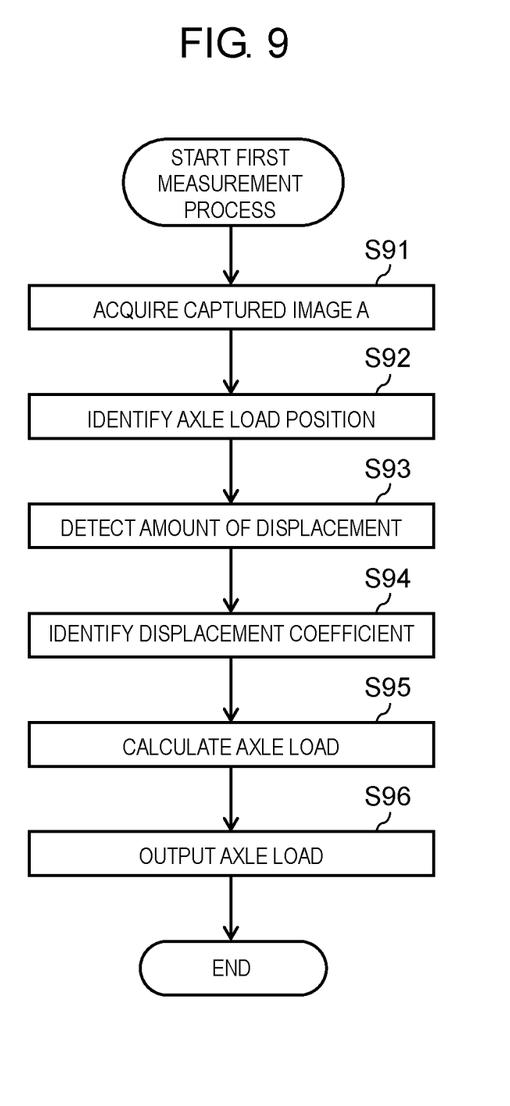
FIG. 9 is a flowchart for describing an operation of the axle load measuring device.

A measurement process is a process, when a captured image which includes a vehicle is inputted into axle load measuring device 200, for calculating an axle load of the vehicle. FIG. 9 is a flowchart for describing an operation of a measurement process of the axle load measuring device.

This measurement process starts when captured image A which includes vehicle 102 is inputted into input unit 210. Upon start of the measurement process, input unit 210 acquires captured image A inputted from imaging apparatus 101 (step S91).

Upon the entry of captured image A, axle load position identifying unit 221 performs image recognition processing to identify lowermost point 610 of tire 600 of vehicle 102. Axle load position identifying unit 221 then identifies, as an axle load position, an area on road 103, which corresponds to identified lowermost point 610 (step S92).

Axle load position identifying unit 221 may in here not always identify one point (one pixel) as an axle load position, and may identify a local image area formed of a plurality of adjacent pixels as an axle load position. Axle load position identifying unit 221 may limit an axle load detection range with which an axle load is detected to an area of road 103, or to part of road 103. A limited area may be specified by a user, or by cooperation of a specification by a user and image recognition of colors and textures of road 103. Limiting an axle load detection range can reduce a burden of image processing. A burden of image processing for detecting an axle load position can therefore be reduced. When a plurality of tires is in contact with road 103 in a captured image, a plurality of axle load positions each corresponding to contact positions will be detected.

Upon the identification of an axle load position, displacement amount detector 222 detects an amount of displacement corresponding to displacement generated at the identified axle load position on the road (step S93). Displacement amount detector 222 detects an amount of displacement using captured image A and captured image B. If input unit 210 has not yet acquired captured image B before an axle load position is identified, displacement amount detector 222 waits until input unit 210 acquires captured image B, and then detects an amount of displacement.

Displacement amount detector 222 detects an amount of displacement generated between an area on road 103, which corresponds to lowermost point 610, in captured image A, and area 710 in captured image B. An amount of displacement generated on a road due to an axle load of an ordinary vehicle is in here very small. Reducing an effect of vibrations of imaging apparatus 100, due to vibrations caused when a vehicle travels on a road, is therefore advantageous.

As one example, displacement amount detector 222 selects, in both captured image A and captured image B, a certain area that will not be identified as an axle load position (e.g., area 640 in captured image A and area 720 in captured image B). Displacement amount detector 222 then calculates an amount of displacement between the selected areas (hereinafter referred to as a "non-axle load position displacement amount"). Displacement amount detector 222 subtracts from an amount of displacement generated between the area on road 103, which corresponds to lowermost point 610 of the tire, in captured image A, and area 710 in captured image B, this non-axle load position displacement amount to correct the amount of displacement. The effect of vibrations of imaging apparatus 100 can thus be reduced. Besides, the effect of vibrations of imaging apparatus 100 can be reduced by a method using an optical image stabilization technology, a method using a mechanical mechanism such as a sensor shift method, etc.

Upon the detection of the amount of displacement, axle load calculator 230 identifies a displacement coefficient corresponding to the axle load position identified by axle load position identifying unit 221 (step S94). In other words, axle load calculator 230 refers to displacement coefficient a stored in storage unit 240 (see FIG. 4) to identify a displacement coefficient corresponding to the axle load position identified by axle load position identifying unit 221.

Upon the identification of the displacement coefficient, axle load calculator 230 multiplies the identified displacement coefficient by the amount of displacement detected by displacement amount detector 222 to calculate an axle load (step S95).

Upon the calculation of the axle load, axle load calculator 230 externally outputs a numerical value of the calculated axle load (step S96). In this case, when the numerical value of the calculated axle load is greater than a predetermined reference value, axle load calculator 230 may notify the user of this situation, in place of externally outputting the numerical value of the calculated axle load.

Upon termination of step S96, axle load measuring device 200 ends the measurement process. Axle load measuring device 200 includes input unit 210 that inputs an image to detect a position of a tire through image recognition.

1-3. Effects, etc.

As described above, imaging apparatus 100 properly captures an image of a road surface area that is subject to an axle load of vehicle 102. With an ordinary imaging condition, a clear image might not be captured, because brightness of pixels is degraded in an image in which an asphalt road surface, in particular a road surface onto which a shadow of a vehicle body is cast is captured.

In the first exemplary embodiment, tire detector 120 detects a position at which tire 600 of vehicle 102 is in contact with road 103. Area setting unit 131 sets a first road surface area including a position onto which an axle load is applied. Analyzer 130 analyzes brightness distribution in the road surface area, and calculates a first brightness range. Controller 140 sets an imaging condition for imaging unit 110 based on the first brightness range. A clear image can therefore be captured, and thus road surface displacement can highly precisely be detected.

Analyzer 130 analyzes brightness distribution in a second road surface area that is not subject to the axle load, and calculates a second brightness range. Controller 140 sets an imaging condition based on the first brightness range and the second brightness range. An image required for correcting an effect of vibrations of imaging unit 110 (for reducing an effect of vibrations of a camera) can appropriately be captured.

1-4. Exemplary Modification

An axle load measuring device according to an exemplary modification will now be described herein with reference to FIGS. 3 and 10.

As described above, axle load measuring device 200 has corrected an amount of displacement generated by an axle load of vehicle 102, using an amount of displacement in area 640 that will not be identified as an axle load position (see FIG. 6). When imaging apparatus 100 captures in here an image of road 103 with an imaging condition appropriate for first road surface area 630, and generates the captured image, a range of brightness in an area used for correction, such as area 640, might deviate from a range of brightness appropriate for detecting an amount of displacement. In such a case, an error in detecting an amount of displacement in an area used for correction increases, and thus an error in calculating an amount of displacement, which indicates an axle load of vehicle 102, might also increase. The axle load measuring device according to this exemplary modification identifies an area used for correction based on a range of brightness in an area for detecting an amount of displacement.

Figure 10:
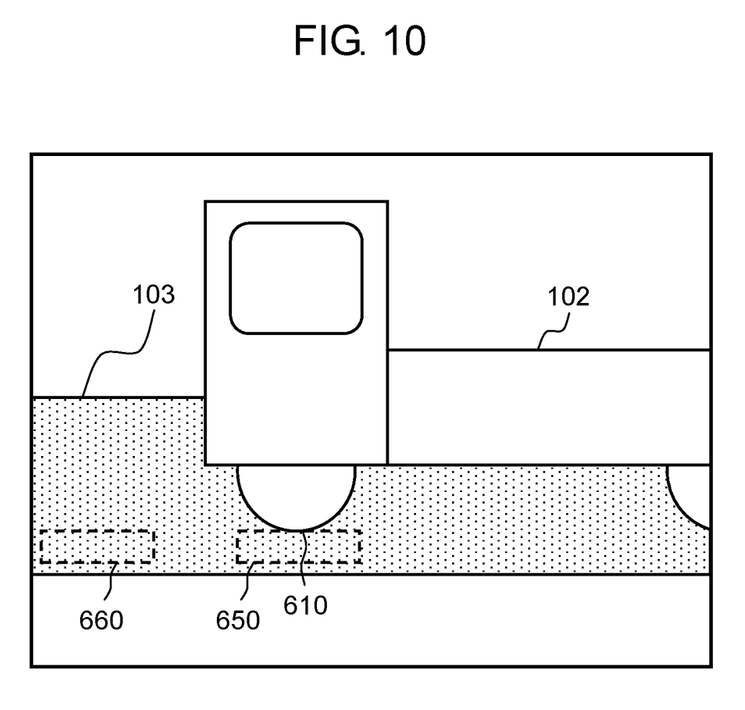
FIG. 10 is a view illustrating still another example of a captured image.

Axle load position identifying unit 221 identifies lowermost point 610 (the contact position) and area 650 including lowermost point 610 on road 103 (the third road surface area) in a captured image illustrated in FIG. 10. Axle load position identifying unit 221 then calculates a range of brightness (the third brightness range) based on brightness distribution in area 650. Axle load position identifying unit 221 identifies, in the captured image, area 660 having a range of brightness, which is substantially identical to a range of brightness in area 650 or having a range of brightness, which is narrower than the range of brightness in area 650 (a fourth road surface area). Area 660 is an area without including area 650, and is an area that would be less likely to be affected by an axle load of vehicle 102. Area 660 may be an area that is at least a predetermined distance away from area 650.

Displacement amount detector 222 detects an amount of displacement at lowermost point 610 on road 103 (contact position displacement amount). Displacement amount detector 222 may at this time perform a comparison with a captured image which includes no vehicle, as illustrated in FIG. 7, to detect an amount of displacement in area 650. Similarly, displacement amount detector 222 detects an amount of displacement in area 660 on road 103 (compared displacement amount).

Axle load calculator 230 calculates an axle load of vehicle 102 based on the amount of displacement at lowermost point 610 and the amount of displacement in area 660. Specifically, axle load calculator 230 subtracts the amount of displacement in area 660 from the amount of displacement at lowermost point 610 to calculate an axle load of vehicle 102.

With the operation as described above, axle load measuring device 200 according to this exemplary modification corrects an axle load of vehicle 102, using an amount of displacement in area 660 having a range of brightness identical to a range of brightness in area 650 for calculating an axle load or having a range of brightness, which is narrower than the range of brightness in area 650. Similar to the range of brightness in area 650, the range of brightness in area 660 is set to a range of brightness appropriate for allowing imaging apparatus 100 to detect an amount of displacement. Axle load measuring device 200 can therefore precisely correct an axle load of vehicle 102 by using an amount of displacement in area 660. In other words, axle load measuring device 200 can precisely measure an axle load of vehicle 102.

Other Exemplary Embodiments

As described above, the exemplary embodiment has been described as an illustration of the technology disclosed in the present application. However, the technique in the present disclosure is not limited to those, and can be also applied to exemplary embodiments in which changes, replacements, additions, omissions, or the like are made.

(1) The first exemplary embodiment has been described that imaging apparatus 100 and axle load measuring device 200 are examples of a configuration for recognizing a tire of a vehicle through an image process, and for identifying an area on a road, which corresponds to a lowermost point of the tire, as an axle load position. However, the method for identifying an axle load position is not necessarily limited to the above-mentioned method. For example, imaging apparatus 100 and axle load measuring device 200 may identify a position where an amount of displacement locally becomes a maximum as an axle load position.

(2) In the first exemplary embodiment, a captured image may be a monochrome image, a color image, or a multi-spectral image. In addition, light to be captured in an image may be ultraviolet ray, near infrared ray, or far infrared ray, as well as visible light.

(3) The first exemplary embodiment has been described using an asphalt-paved road surface as a road surface of road 103. However, a road surface of road 103 may be, in addition to an asphalt-paved road surface, a concrete-paved road surface or a road surface paved with another material. A road surface of road 103 may also be a road surface of one of the above described paved road surfaces partially coated or covered with another material such as a plate material a sheet material, or paint. To more precisely and significantly obtain displacement based on an image, a road surface of road 103 may be covered with one of the above-mentioned materials, and the covered area may be specified to an area from which displacement is to be detected.

(4) The components (function blocks) in imaging apparatus 100 may be implemented as single chips respectively, or a single chip may incorporate some or all of them, by means of a semiconductor device such as an integrated circuit (IC) or large scale integration (LSI). The method of implementing integrated circuitry is not limited to LSI, and implementation may be achieved by means of dedicated circuitry or a general-purpose processor. A field programmable gate array (FPGA) for which programming is possible after LSI fabrication, or a reconfigurable processor allowing reconfiguration of connections and settings of circuit cells within an LSI, may also be used in implementing integrated circuitry. Further, if a new integrated circuit implementation technique comes out to replace the LSI as a result of the development of semiconductor technique or a derivative other technique, naturally the functional blocks may be integrated by using that technology. For example, application of biotechnology is possible.

Further, all of or a part of various processes described above may be implemented by a hardware product such as an electronic circuit, or may be implemented by using software. It is to be noted that the process using software is implemented in such a way that the processor in the imaging apparatus executes the program stored in the memory. Furthermore, the program may be recorded in a recording medium and may be distributed or circulated. For example, the distributed program is installed in another device including a processor and is executed by the processor of the device. In this way, the device can execute the processes described above.

In addition, embodiments implemented by any combination of the constituent elements and functions of the exemplary embodiments described above are included in the scope of the present disclosure.

The present disclosure is applicable to an imaging apparatus that captures and generating an image for measuring displacement on a road surface.

What is claimed is:

1. An axle load measuring system comprising:
   an imaging apparatus, wherein the imaging apparatus includes:
      an imaging unit that captures an image of a road on which a vehicle runs and generates the captured image of the road;
      a detector that detects, in the captured image, a contact position at which the vehicle is in contact with the road;
      a calculator that calculates a first brightness range based on brightness distribution in a first road surface area on the road, the first road surface area including the contact position; and
      a controller that determines an imaging condition for the imaging unit based on the first brightness range and controls the imaging unit using the determined imaging condition; and
   an axle load measuring device that measures an axle load of the vehicle using the captured image, wherein the axle load measuring device includes:
      an axle load position identifying unit that identifies the contact position in the captured image;
      a displacement amount detector that detects a contact position displacement amount representing an amount of displacement at the contact position; and
      an axle load calculator that calculates the axle load based on the contact position displacement amount.

2. The axle load measuring system according to claim 1, wherein
   the detector recognizes a tire of the vehicle to detect the contact position.

3. The axle load measuring system according to claim 1, wherein
   the calculator calculates a second brightness range based on brightness distribution in a second road surface area on the road, the second road surface area being at least a predetermined distance away from the first road surface area, and
   the controller determines the imaging condition based on the first brightness range and the second brightness range.

4. The axle load measuring system according to claim 3, wherein
   the predetermined distance is a distance from the first road surface area to an area that is not subject to an axle load of the vehicle.

5. The axle load measuring system according to claim 1, wherein
   the imaging condition includes at least one item of a diaphragm, a gain, an exposure time, and a black level of the imaging unit.

6. The axle load measuring system according to claim 1, wherein the controller determines the imaging condition, and then controls the imaging unit using the imaging condition for a predetermined period.

7. The axle load measuring system according to claim 2, wherein
when the detector does not recognize a tire of a vehicle for a predetermined period, the controller controls the imaging unit using a predetermined imaging condition.

8. The axle load measuring system according to claim 1, wherein
the calculator determines whether the first brightness range satisfies a predetermined condition, and
when the calculator determines that the first brightness range does not satisfy the predetermined condition, the calculator stores the captured image.

9. The axle load measuring system according to claim 1, wherein
the calculator determines whether the first brightness range satisfies a predetermined condition, and
when the calculator determines that the first brightness range does not satisfy the predetermined condition, the calculator notifies that the captured image is abnormal.

10. The axle load measuring system according to claim 1, wherein
the axle load position identifying unit identifies a third road surface area which is on the road and which includes the contact position, calculates a third brightness range based on brightness distribution in the third road surface area, and identifies, in the captured image, a fourth road surface area having a brightness range identical to the third brightness range or having a brightness range narrower than the third brightness range, without including the third road surface area,
the displacement amount detector detects a compared displacement amount representing an amount of displacement in the fourth road surface area, and
the axle load calculator calculates the axle load based on the contact position displacement amount and the compared displacement amount.

11. An axle load measuring method comprising:
detecting, in a captured image of a road on which a vehicle runs, a contact position at which the vehicle is in contact with the road;
calculating a first brightness range based on brightness distribution in a first road surface area on the road, the first road surface area including the contact position;
determining an imaging condition for an imaging unit based on the first brightness range;
controlling the imaging unit using the determined imaging condition;
identifying the contact position in the captured image;
detecting a contact position displacement amount representing an amount of displacement at the contact position; and
calculating an axle load of the vehicle based on the contact position displacement amount.

* * * * *